(12) United States Patent
Moulckers et al.

(10) Patent No.: US 7,496,570 B2
(45) Date of Patent: *Feb. 24, 2009

(54) INTERACTIVE FILTERING MODEL TO ENHANCE A SOFTWARE COMPONENT META MANAGEMENT SYSTEM

(75) Inventors: Ingrid M. Moulckers, Austin, TX (US); Ningning Wang, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

This patent is subject to a terminal disclaimer.

(21) Appl. No.: 11/343,187

(22) Filed: Jan. 30, 2006

(65) Prior Publication Data

US 2007/0192307 A1    Aug. 16, 2007

(51) Int. Cl.
*G06F 17/30* (2006.01)

(52) U.S. Cl. .............. 707/5; 707/103 R; 707/100; 707/8

(58) Field of Classification Search .............. None
See application file for complete search history.

(56) References Cited

U.S. PATENT DOCUMENTS

| | | | |
|---|---|---|---|
| 5,933,646 A * | 8/1999 | Hendrickson et al. | 717/169 |
| 6,185,734 B1 * | 2/2001 | Saboff et al. | 717/164 |
| 6,219,829 B1 * | 4/2001 | Sivakumar et al. | 717/131 |
| 6,427,230 B1 | 7/2002 | Goiffon et al. | |
| 6,484,214 B1 | 11/2002 | Sundermier | |
| 6,564,375 B1 | 5/2003 | Jiang | |
| 6,775,829 B1 * | 8/2004 | Kroening | 717/175 |
| 6,993,771 B1 * | 1/2006 | Hasha et al. | 719/318 |
| 2002/0042923 A1 | 4/2002 | Asmussen et al. | |
| 2002/0194584 A1 * | 12/2002 | Suorsa et al. | 717/176 |
| 2003/0005412 A1 | 1/2003 | Eanes | |
| 2003/0192027 A1 * | 10/2003 | Porter | 717/100 |
| 2003/0217121 A1 | 11/2003 | Willis | |
| 2004/0031015 A1 * | 2/2004 | Ben-Romdhane et al. | 717/107 |
| 2004/0268295 A1 * | 12/2004 | Culter | 717/103 |
| 2006/0174216 A1 * | 8/2006 | Peterson et al. | 715/853 |
| 2006/0218528 A1 * | 9/2006 | Lerner et al. | 717/120 |

OTHER PUBLICATIONS

*Reusable Software Development Toolset*, Pub. No. TDB n.2, Jul. 1990, pp. 299-300, IBM TDB.

* cited by examiner

*Primary Examiner*—Don Wong
*Assistant Examiner*—Binh V Ho
(74) *Attorney, Agent, or Firm*—Matt Talpis; Gregory K. Goshorn; Greg Goshorn, P.C.

(57) ABSTRACT

Provided is a method for generating an on-demand, custom runtime solution to a user or business's computing needs. A library of software components corresponding to different computing tasks of a business situation is created. Each software component is associated with one or more meta descriptors. The software components and related meta descriptors are managed by means of a software component meta management system (SCMMS). Based upon customer, input, various components are selected, or filtered, for incorporation into a business runtime solution. In addition to the user input, user queries are feedback into the SCMMS so that the SCMMS accumulates knowledge about the customer's usage. The knowledge is then employed to facilitate and improve the generation of future runtime solutions for both the customer and other customers.

1 Claim, 10 Drawing Sheets

INTERACTIVE FILTERING MODEL TO ENHANCE A SOFTWARE COMPONENT META MANAGEMENT SYSTEM

TECHNICAL FIELD

The present invention relates generally to computer application development and, more specifically, to a system and method for creating a custom software solution for a business problem.

BACKGROUND OF THE INVENTION

International Business Machines Corp. (IBM) of Armonk, N.Y. has been at the forefront of new paradigms in business computing. For decades, the typical paradigm for business computing is that custom business applications were specifically designed and built for every business need. Of course, most custom business applications benefited from commonly-available, standardized applications. For example, a business that requires a database management system (DBMS) has several vendors from which to choose and each choice typically provides many of the same necessary features and interfaces to an application developer. However, a DBMS is only one of a multitude of possible components that may be required to implement a business solution.

With the advent of the Internet, sometimes referred to as the "web," business communication has also evolved. Businesses and consumers have multiple means of communication not previously available, including, but not limited to, business-to-business (B2B) and business-to-consumer (B2C) links. As businesses seek to take advantage of the web, some companies have provided specific applications, called "e-business" applications, that work in that particular environment. In addition, companies, such as International Business Machines Corporation (IBM) of Armonk, N.Y., have developed products that facilitate the deployment, integration, execution and management of e-business applications. One such IBM product is "WebSphere," which encompasses tools for developing e-business applications and middleware for running web-based applications. One part of WebSphere is a WebSphere Application Server (WAS), which is a runtime component of the WebSphere family of products. Basically, WAS is a Java process with a Java Virtual Machine (JVM).

There are several approaches to the development of a business software solution for a particular business. One approach involves an independent software vendor (ISV) who integrates software components into an "application package." Another approach involves a system integrator (SI) who integrates software and hardware components and application packages. The SI determines required functionality, selects commercially available hardware and software components that implement portions of the required functionality and generate a final "solution package." In addition to any tasks performed by a SI, a solution provider (SP) may produce custom software to integrate and enhance the commercially available hardware and software components and infrastructure software. The terms SI and SP are often used interchangeably. The software components that an ISV or SP integrate with software components is called custom code (sometimes also called "application" or "glue" code). Examples of typical software components include, but are not limited to, an IBM HTTP Server and associated plug-ins, a WebServer Application Server-Express runtime application and an IBM DB2 Universal Database (UDB) component. The claimed subject matter may be employed by an SI, SP or ISV so throughout the Specification, SIs, SPs and ISVs will all be referred to as "developers" or "users" (as in users of the tools provided with respect to the claimed subject matter).

Two terms that may be useful to clarify are the terms "application" and "solution." In some cases, an application solves several problems and as a result may be considered a solution. However, usually the term "solution" refers to an application because a solution solves a target set of problems, although some developers call their applications a solution. A solution is usually broader than an application because it resolves or addresses horizontal as well as vertical business problems. Solutions are typically delivered for the purpose of running a business end-to-end and not just focused on a portion (or application of the business). An application is applied to solve a set of problems for a business and might be applied to solve another set of problems of the same kind for another customer.

What is needed is a method and system, or a software component meta management system (SCMMS), for enabling a developer, e.g. ISV, SP or SI, to view and select available components for a particular application or solution based upon an objective scoring system. Ideally, the objective scoring system may be adjusted to reflect knowledge about the customer's specific needs and sophistication and includes feedback so that the generation of a particular application or solution provides more accurate scoring, and thus better results, with respect to the generation of subsequent applications or solutions.

SUMMARY OF THE INVENTION

Provided is a method for generating an on-demand, custom runtime solution to a user or business's computing needs. A library of software components corresponding to different computing tasks of a business situation is created. Each software component is associated with one or more meta descriptors. The software components and related meta descriptors are managed by means of a software component meta management system (SCMMS).

Based upon customer, input, various components are selected, or filtered, for incorporation into a business runtime solution. In addition to the user input, user queries are feed back into the SCMMS so that the SCMMS accumulates knowledge about the customer's usage. The knowledge is then employed to facilitate and improve the generation of future runtime solutions for both the customer and other customers.

To employ the SCMMS to develop a system, a user inputs requirements that are represented as requirement descriptors and mapped to external conditions, classifications and keywords. The external conditions are checked against the stored components external dependencies to filter out those components that include dependencies that can not be satisfied. The external classifications are also employed to filter the components by rejecting components that do not match the classifications. The external keywords are employed to search keywords associated with the available components' meta descriptors. A keyword score is generated based upon the degree of matching between the user's keywords and the meta descriptor keywords.

The particular number of filtered components that the user is then presented for selection is based upon a predefined limit. If the number of filtered components exceeds the predefined limit, the user is asked to provide more information, e.g. external conditions, classifications and keywords and the filtering process is repeated. Once components are selected, an applications score is calculated for each component based upon the match of user provided requirement descriptors and application attributes associated with the meta descriptors. The applications scores of all selected components are employed to generate an association score corresponding to each component.

A final score for the selected components is then generated based upon the keyword, application and association scores in conjunction with constants associated with the SCMMS. The constants are selected by an administrator of the SCMMS based upon knowledge of the user with the objective of optimizing results for the user.

Results are presented to the user in the order of the final score. The user then browses the result set and selects desired components. As components are selected, new associations are generated based upon the selected component and previously selected components and association information is added to the meta descriptor of corresponding components. In this manner, the SCMMS "learns" from the user's selections and can apply this learning to future executions of the SCMMS.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to a WebSphere based system, the claimed subject matter can be implemented in any information technology (IT) system in which component reuse is desirable. The disclosed subject matter is also applicable to non-homogeneous systems. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for generating an on-demand, custom runtime solution to a user or business's computing needs. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
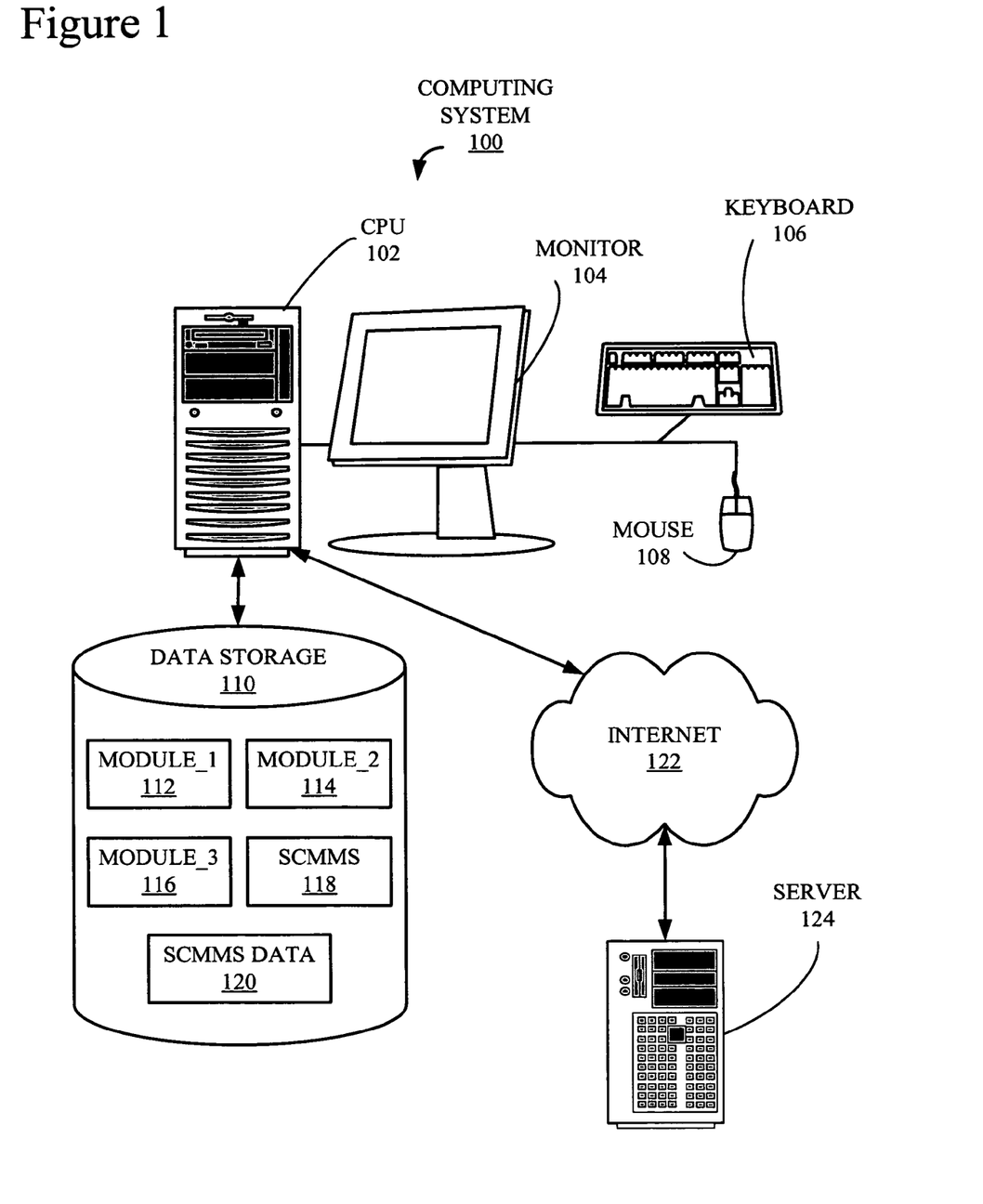
FIG. 1 is a block diagram of an exemplary computing system that incorporates the claimed subject matter.

Turning now to the figures, FIG. 1 is a block diagram of an exemplary computing system architecture 100 that incorporates the claimed subject matter. A central processing unit (CPU) 102 is coupled to a monitor 104, a keyboard 106 and a mouse 108, which together facilitate human interaction with computing system 100. Attached to CPU 102 is a data storage component 110, which may either be incorporated into CPU 102 i.e. an internal device, or attached externally to CPU 102 by means of various, commonly available connection devices such as but not limited to, a universal serial bus (USB) port (not shown). Data storage 110 is illustrated storing several exemplary computer programming modules, i.e. a "Module_1," 112, a "Module_2," 114 and a "Module_3," 116. It should be noted that a typical application or system would include many more than three (3) modules, but for the sake of simplicity only three are shown. Module_1 112, module_2 114 and module_3 116 represent components of a library of software components from which a developer selects specific components corresponding to different computing tasks of a business situation.

Also stored on data storage 110 is a software component meta management system (SCMMS) 118. SCMMS 118 is a system for generating an on-demand, custom runtime solution to a user or business's computing needs. Each software component 112, 114 and 116 is associated with one or more meta descriptors (not shown), which are stored in a SCMMS data area 120. Software components 112, 114 and 116 and related meta descriptors stored in data area 120 are managed by means of SCMMS 118.

CPU 102 is connected to the Internet 122, which is also connected to a server computer 124. Although in this example, CPU 102 and server 124 are communicatively coupled via the Internet 122, they could also be coupled through any number of communication mediums such as, but not limited to, a local area network (LAN) (not shown). Further, it should be noted there are many possible computing system configurations, of which computing system 100 is only one simple example.

Figure 2:
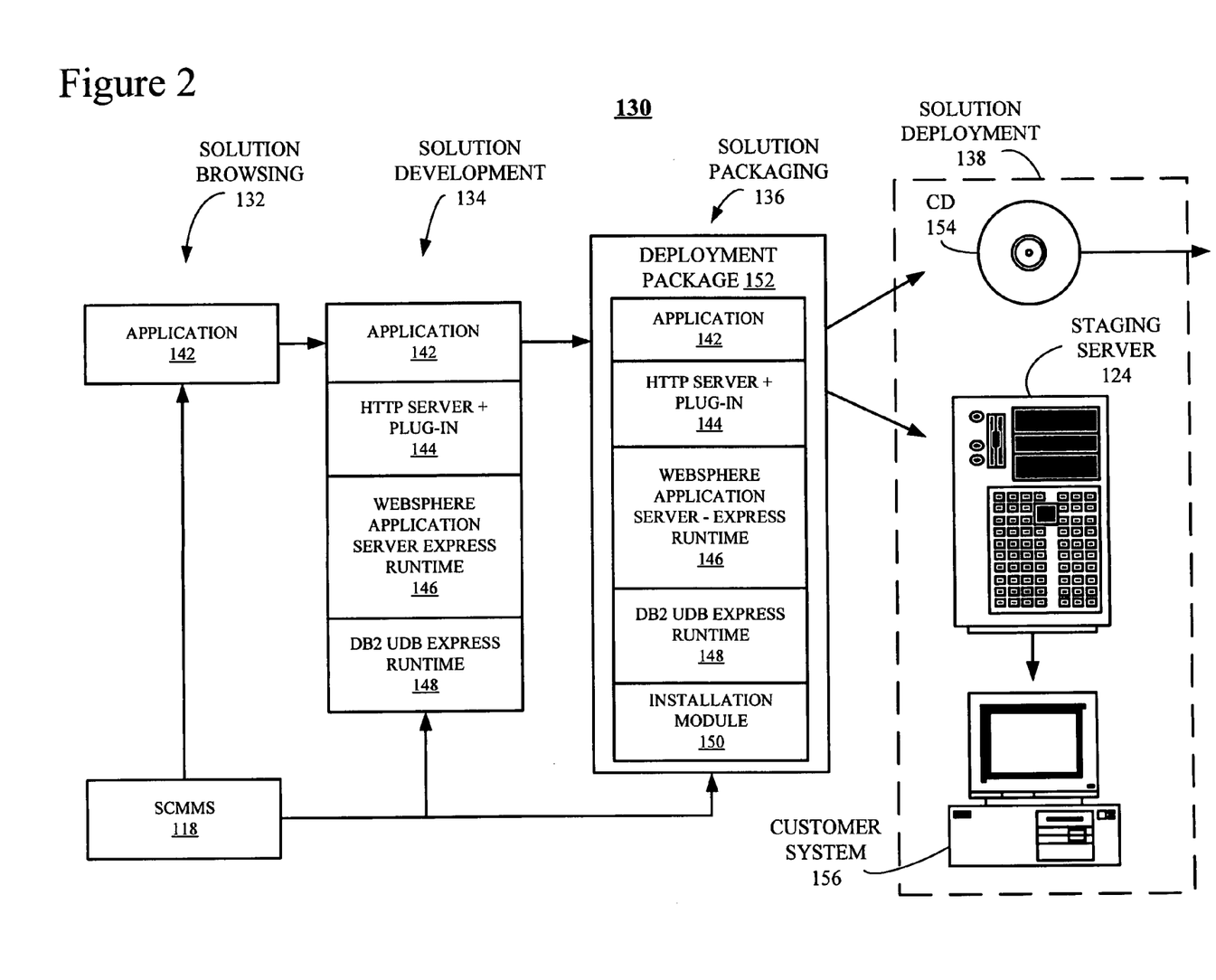
FIG. 2 is a block diagram of an exemplary application development architecture, including distribution elements, that employs the claimed subject matter.

FIG. 2 is a block diagram of a solution, or application, development system 130 that employs the claimed subject matter. In particular software markets in which a developer delivers custom business solutions, the process can be broken into at least three (3) distinct phases: solution browsing 132, solution development, or solution composing, 134; and solution packaging 136. Solution testing (not shown) is a subset of solution development 134. A solution deployment phase 138 might be considered a fourth phase.

Although described primarily with respect to solution browsing phase 132, the claimed subject matter, as exemplified by SCMMS 118 (FIG. 1), can be applied to solution development 134, solution packaging 136 and solution deployment 138 as well.

During solution browsing 102, a developer accesses SCMMS 118 to select components, such as module_1 112 (FIG. 1), module_2 114 (FIG. 1) and module_3 116 (FIG. 1), which the developer determines necessary for inclusion in a proposed business solution, in this example an application 142. It should be noted that there may be any number of components selected, each of which may be created by technical experts or an off-the-shelf product. The process for selecting components for inclusion into application 142 is described in more detail below in conjunction with FIGS. 5-10.

In this example, the developer selects, during solution browsing 142, custom software and other components for providing functionality that is specific to the particular business problem. SCMMS 118 assists this process by providing the capability to view the name, associated characteristics and rankings of available components.

During solution development 134, core components such as, but not limited to, a HTTP server and associated plug-ins 144, a Websphere application server express runtime module 146 and a DB2 universal database (UDB) express runtime module 148. Components 144, 146 and 148 provide necessary functionality to application 142. As explained above, SCMMS 118 is employed to enable the developer to select among various choices for each of the components 144, 146 and 148. As in solution browsing 132, the various components added during solution development 134 may be custom-designed or "off-the-shelf" modules, applications and/or devices.

During solution packaging 136, the developer, with the assistance of SCMMS 118, typically provides addition components as needed to produce a deployment package 152. For example, in addition to application 112 and components 144, 146 and 148, the developer may need to provide a component such as an installation module 150 that, in this example, decompresses computer memory files and installs solution packaging 136 on a target system, such as a customer system 156. SSMMS 118 may be employed by the developer make an informed decision among a number of available installation modules. In solution packaging 136, deployment package 152 is produced for delivery via, in this example, either a CD 154 and/or a staging server, such as server 124 (FIG. 1).

Solution deployment 138 illustrates some methods of distributing solution package 152 to an eventual client or customer. Examples of such distribution techniques include, but are not limited to, compact disk (CD) 154, which is mailed or otherwise delivered to the customer for installation on customer system 156; and server 124 (FIG. 1), from which customer system 156 can download a product or solution, such as deployment package 152. Those with skill in the computing arts should recognize that there are many possible delivery options in addition to CD 154 and server 124.

Figure 3:
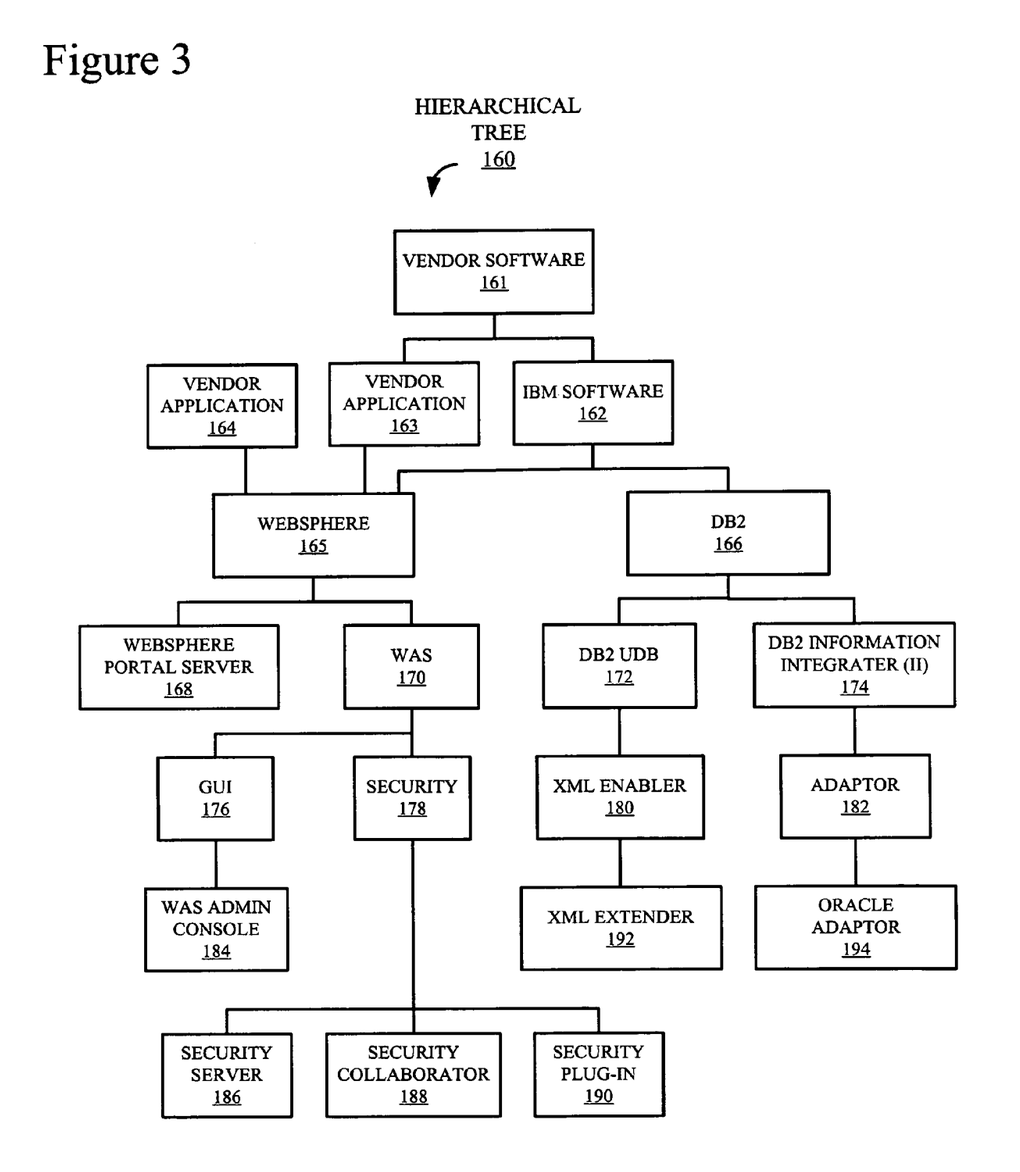
FIG. 3 is block diagram of hierarchical tree that exemplifies the hierarchical structure employed with the claimed subject matter.

FIG. 3 is block diagram of exemplary hierarchical tree 160 that illustrates a hierarchical structure employed in this description of the claimed subject matter. Tree 160 starts at a top level of vendor software 161, which represents a business solution for a particular client. Of course, tree 160 is only one example of a hierarchical structure and vendor software 161 is only one example of an entry in tree 160. Under vendor software 161 are two exemplary applications, i.e. an IBM software component 162 and a vendor application 163. In other words, in this example, the client's software solution 161 is comprised of both IBM software 162 and software or applications 163 developed by the vendor themselves.

IBM software 162 is comprised of two components, i.e. WebSphere components 165 and DB2 components 166. In addition, in this example, vendor application 163 is illustrated as being comprised of components of WebSphere 165. Included one level below WebSphere 165 in tree 160 are two components, i.e. a WebSphere Portal Server 168 and a WebSphere Application Server (WAS) 170. A second vendor application 164 is also comprised of components associated with WebSphere portal server 168.

WAS 170 includes a graphical user interface (GUI) 176 and a security component 178. GUI 176 includes a WAS admin console 184. Security component 178 includes a security server 186, a security collaborator 188 and a security plug-in module 190.

DB2 component 166 includes a lower level DB2 Universal Database (DB2 UDB) component 172 and a DB2 Information Integrator (II) component 174. DB2 UDB 172 includes an Extensible Markup Language (XML) enabler component 180, which includes a XML extender component 192. DB2 II component 174 includes an adaptor component 182, which includes an Oracles adaptor component 194.

In this example, vendor software 161 is at the top level and every other component in tree 160 is at a lower level than vendor software 161. In a similar fashion, Websphere 165 is a higher level than both Websphere portal server 168 and WAS 170, which are at a lower level. The significance of a particular component's position in tree 160 determines how a specific rule applied to one component affects other components. Examples of types of rules that apply to tree 160 include, but are not limited to, lifecycle rules, versioning rules, interrelationship rules and access control rules.

Some exemplary rules are as follows:

Lifecycle Rules

Register/Create: Registration happens at multiple levels. When registration happens at a higher level, lower levels' components' meta descriptors 200 (see FIG. 4) are automatically populated with information in the higher level's meta descriptor 200.

Figure 4:
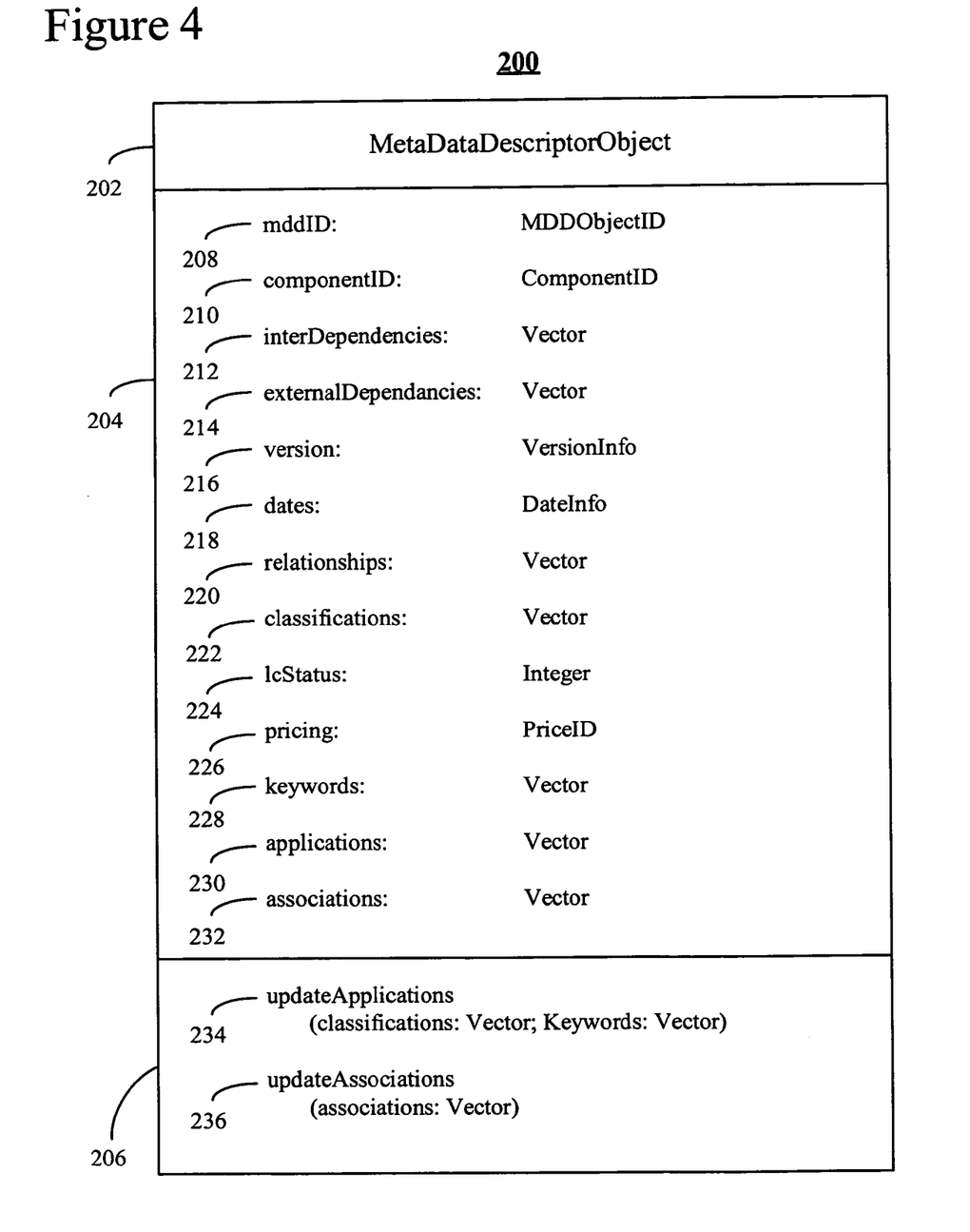
FIG. 4 is an exemplary MetaDataDescriptorObject (MDDO) memory object employed in one implementation of the claimed subject matter.

Modify/Update: Lower level nodes can override inherited meta descriptors 200 to better describe themselves. Updates of higher level nodes populate children nodes if so configured. In other words, there is optional propagating.

Delete: A delete operation propagates to lower level nodes.

Versioning

Multiple versions of the same software or component can be maintained by SCMMS 118 (FIG. 1) and retrieved upon request.

Query: Current versions are retrieved when a query does not include versioning specific information.

Create/Register New Version: Versioning happens at different levels. A current version tag is moved from previous version components to a newer version component.

Version Tags: Version tags are employed to group components across versions into virtual groups for easy retrieval. For example, a "Stable Version" may include a version 1.0 of Websphere portal server 168 and a version 1.2 of WAS 170, and so on. In this example, the Stable Version group denotes a grouping of components that have been tested or proven to work together.

Interrelationships

Three basic interrelationships are defined: inclusion; dependency and mutual exclusiveness, with inclusion and dependency having a direction.

If an inclusion relationship is create from a component A, such as DB2 166, to a component B, such as DB2 UDB 172, the same relationship is created from all component A's ancestor components, such as vendor software 161 and IBM software 162, and all of component B's descendent components, such as XML enabler 180 and XML extender 192.

If a dependence relationship is created from a component A, such as DB2 166, to a component B, such as DB2 UDB 172, the same relationship is created from all component A's ancestor components, such as IBM software 162 and vendor software 161.

If a mutual exclusiveness relationship is created between a component A, such as XML extender 192, to a component B, such as Oracle adaptor 194, the same relationship is created between all of component A's ancestors, such as XML enabler 180 and DB2 UDB 172, and all of component B's ancestors, such as adaptor 182 and DB2 II 174.

Access Control

A grant of access to a higher level component propagates to descendent lower level components.

A denial of access to a lower level component propagates to ancestor higher level components.

It should be noted that the rules and specific components listed above are only for the purposes of illustration. A set of rules in any particular implementation of the claimed subject matter may include additional, less or modified version of these examples. In addition, the specific examples on the compatibility of components do not necessarily reflect the actual compatibilities of the exemplary components.

FIG. 4 is an exemplary MetaDataDescriptorObject (MDDO) memory object 200 employed in an implementation the claimed subject matter. MDDO memory object 200 includes a title section 202, which merely states the name of object 200, i.e. "MetaDataDescriptorObject," an attribute section 204, which contains memory elements, or attributes, associated with MDDO memory object 200, and a method section 206, which includes functions, or methods, that may be executed in conjunction with MDDO memory object 200. It should be noted that the attributes and methods described are used for the purpose of illustration only. Additional and/or different attributes and methods may be employed to implement the claimed subject matter.

Attribute section 202 includes an "mddID" attribute 208, a "componentID" attribute 210, an "interDependencies" attribute 212, an "externalDependencies" attribute 214, a "version" attribute 216, a "dates" attribute 218, a "relationships" attribute 220, a "classifications" attribute 222, an "lcStatus" attribute 224, a "pricing" attribute 226, a "keywords" attribute 228, an "applications" attribute 230 and an "associations" attribute 232. Instantiations of object 200 are stored in SCMMS data 120 (FIG. 1) of data store 110 (FIG. 1).

MddID attribute 208 is a variable of type MDDObjectID that contains a reference to the particular instance of object 200. Each instance of object 200 has a unique value for attribute 208 that allows each instance to be uniquely identified. ComponentID attribute 210 is a variable of type ComponentID that stores a reference to a particular component associated with a particular instantiation of object 200. Both mddID attribute 208 and componentID attribute 210 are employed by a Select Components process 300 (see FIGS. 5-10) to locate information concerning a particular component prior to the selection of that resource.

InterDependencies attribute 212 is a variable of type Vector that stores a record of components that the component referenced by this instantiation of object 200 depends upon and those components that depend upon this particular instantiation. In other words, attribute 212 is a list of variables of type componentID 210 that reference components related to the particular instantiation of object 200.

ExternalDependencies attribute 214 is a variable of type Vector that stores a record of the external software or system that the component referenced by this instantiation of object 200 depends upon. Some examples include, but are not limited to, specific operating systems, middleware platform, adaptors and so on.

Version attribute 216 is a variable of type VersionInfo that identifies a particular data structure (not shown) that stores information such as, but not limited to, a version number for the component referenced by object 200, a number of the latest version and tagging information, e.g. "Beta," "GA," "test," etc.

Dates attribute 218 is a variable of type DateInfo that identifies a particular data structure (not shown) that stores information including, but not limited to, a date the particular instantiation of object 200 was created, a date object 200 the instantiation was modified and a date the instantiation expires or is no longer valid for selection.

Relationships attribute 220 is a viable of type Vector that stores a record of other components to which the particular instantiation of object 200 shares a relationship. For example, some components may be a sub-component, super-component, "parent," "child" or "sibling" of other components.

Classifications attribute 222 is a variable of type Vector that stores a record of predefined vendor-dependent classifications. LcStatus attribute 224 is a variable of type Integer that stores information concerning the life cycle status of the corresponding object 200. For example, a particular object 200 may be "Obsolete," "Deprecated," "Released," "Withdrawn," and so on.

Pricing attribute 226 is a variable of type PriceID that identifies a particular data structure (not shown) that stores pricing information corresponding to the corresponding component. For example, the pricing data structure may include information on wholesale and retail prices for the particular component or a formula for determining a price based upon the manner in which the component is used in conjunction with other components.

Keywords attribute 228 is a variable of type Vector that stores keywords, typically related to the corresponding component's core functions. Attribute 228 is searched during a "Search Keywords" block 310, which is explained below in conjunction with FIG. 5.

Applications attribute 230 is a variable of type Vector that stores records relating to how the corresponding component has been used before by other users or developers. Attribute 230 changes over time to dynamically feedback user's requirements to the corresponding component, thus supplementing SCMMS 118 (FIG. 1) by providing experience based intelligence. Some examples of user feedback stored in attribute 230 are classifications and keywords used by previous developers when the corresponding component was selected.

Associations attribute 232 is a variable of type Vector that stores records relating to other components that have been employed in conjunction with the corresponding component. For example, module_1 112 (FIG. 1) and module_2 114 (FIG. 1) may typically be used in conjunction with each other and, therefore, attribute 232 corresponding to module_1 112 lists module_2 114 and the number of times the two modules 112 and 114 have been used in conjunction with each other. Of course, attribute 232 corresponding to module_2 114 would, in this example, also store corresponding information relating to module_1 112.

Method section 206 of object 200 includes two exemplary functions, or methods. Only two methods are illustrated for the sake of simplicity. Those with skill in the programming arts should appreciate that an object such as object 200 would typically include many additional methods including, but not limited to, constructors, destructors, and methods to set and get values for various attributes.

An "updateApplications" method 234 is called during an Integrate Components block 316 explained in more detail below in conjunction with FIGS. 5 and 7. Method 234 is called to update attribute 230 of the corresponding component so that, as explained above, SCMMS 118 is able to learn form past experience. In this example, method 234 is called with two parameters: "classifications," a variable of type Vector that stores the various classifications employed during a "Check Classifications" 308 (see FIG. 5) and "keywords," a variable of type Vector that stores the various keywords employed during Search Keywords block 310.

An "updateAssociations" method 236 is called during Integrate Components block 316 explained in more detail below in conjunction with FIGS. 5 and 7. Method 236 is called to update attribute 232 of the corresponding component so that, as explained above, SCMMS 118 is able to learn from past experience. In this example, method 236 is called with one parameter: "associations," a variable of type Vector that stores componentIDs of components found during a "Determine Associations" block 358 (see FIG. 7) that are associated with the corresponding component.

It should be understood that MDDO object 200 is only one example of a memory object that may be used to implement the claimed subject matter. Other memory objects with fewer, more and/or different attributes and methods may be employed. In addition, there are many ways other than employing object 200 to implement the functionality and data storage of the claimed subject matter. For example, the claimed subject matter may be implemented by means of a computer program in conjunction with a relational database.

Figure 5:
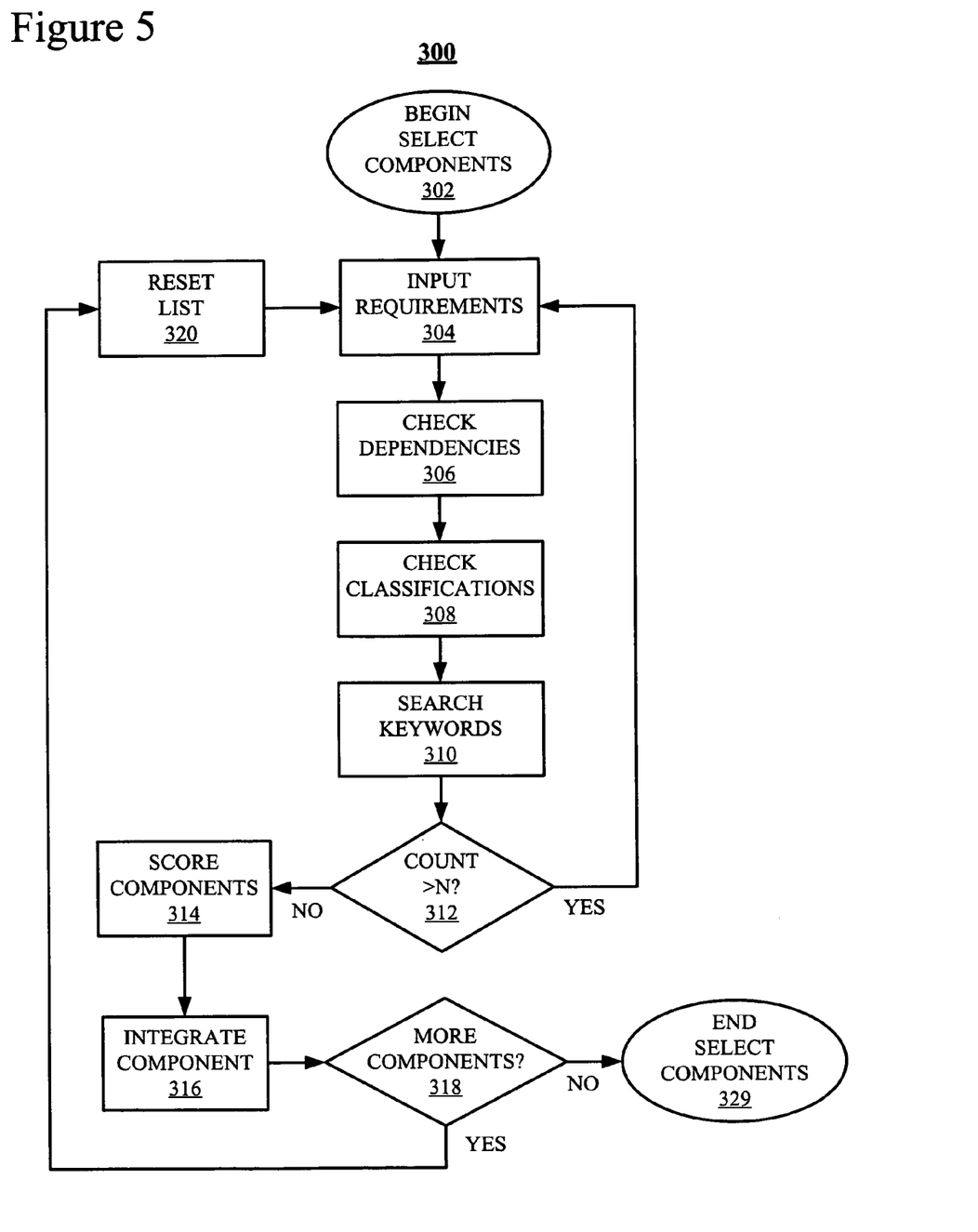
FIG. 5 is a flow chart of a Select Components process that executes in conjunction with the claimed subject matter.

FIG. 5 is a flow chart of a Select Components process 300 executed by SCMMS 118 of FIG. 1. Portions of process 300 are described in more detail below in conjunction with FIGS. 6-10. In this example, process 300 executes on CPU 102 (FIG. 1) and is generally controlled by a developer or user by virtue of the interaction of keyboard 106 (FIG. 1), mouse 108 (FIG. 1) and a graphical user interface (GUI) (not shown), displayed on monitor 104.

Process 300 starts in a "Begin Select Components" block 302 and control proceeds immediately to an "Input Requirements" block 304. During block 304, an operator, e.g. a user or developer, enters, either via the GUI or in a text format, requirements, typically in the form of keywords, corresponding to a desired component. For example, if some type of database component is necessary for an implementation of the application or business solution, then a database descriptor is entered. Other descriptors may be included to further restrict such factors as the type, cost and so on of the database. The various descriptors that may be entered are mapped external conditions, classifications and keywords.

During a "Check Dependencies" block 306, process 300 checks external dependencies mapped to the descriptors input during block 304 against potential components, such as in this example module_1 (FIG. 1), module_2 (FIG. 1) and module_3 (FIG. 1). If a particular component has external dependencies that can not be satisfied, the component is removed, or "filtered," from the list of potential components. During a "Check Classification" block 308, process 300 employs classifications, defined by the operator, to further filter the list of possible components. During a "Search Keywords" block 310, process 300 matches keywords entered by the operator during block 304 with keywords included in meta descriptors associated with each component on the list of potential components. Components that do not contain keywords are filtered from the list of potential components.

During a "Count>N?" block 312, process 300 determines whether or not the number of components remaining on the list of potential components after the filtering of blocks 306, 308 and 310 is greater or smaller than a user-predefined number N. The number N represents the maximum number of components the operator is willing to browse to manually select a particular component. If the count exceeds the number N, process 300 returns to Input Requirements block 304 during which the operator enters additional requirements to further filter the list of potential components. Processing then continues as described above.

If during block 312 the number of components in the list does not exceed the number N, then process 300 proceeds to a "Score Components" block 314. During block 314, process 300 calculates a keyword score, an application score, an association score and a final score for each component remaining on the list. Score Components block is explained in more detail below in conjunction with FIGS. 6-10. The mechanics of calculating the keyword, application and association scores are explained in more detail below in conjunction with FIGS. 8-10, respectively.

During an "Integrate Component" block 316, process 300 enables the operator to select a particular component from the remaining components on the list of potential components and the selected component is integrated into the application of business solution that is being generated. Block 316 is explained in more detail below in conjunction with FIG. 7.

During a "More Components?" block 318, the operator is given the option of selecting more components or proceeding with the components that have already been selected. If the operator decides to select more components, process 300 proceeds to a "Reset List" block 320 during which process 300 restores the list of potential components to the original unfiltered state. Then, process 300 returns to Input Requirements block 304 and processing continues as described above to select an additional component. If during block 318 the operator decides to proceed with the components that have already selected, process 300 continues to an "End Select Components" block 329 in which process 300 is complete.

Figure 6:
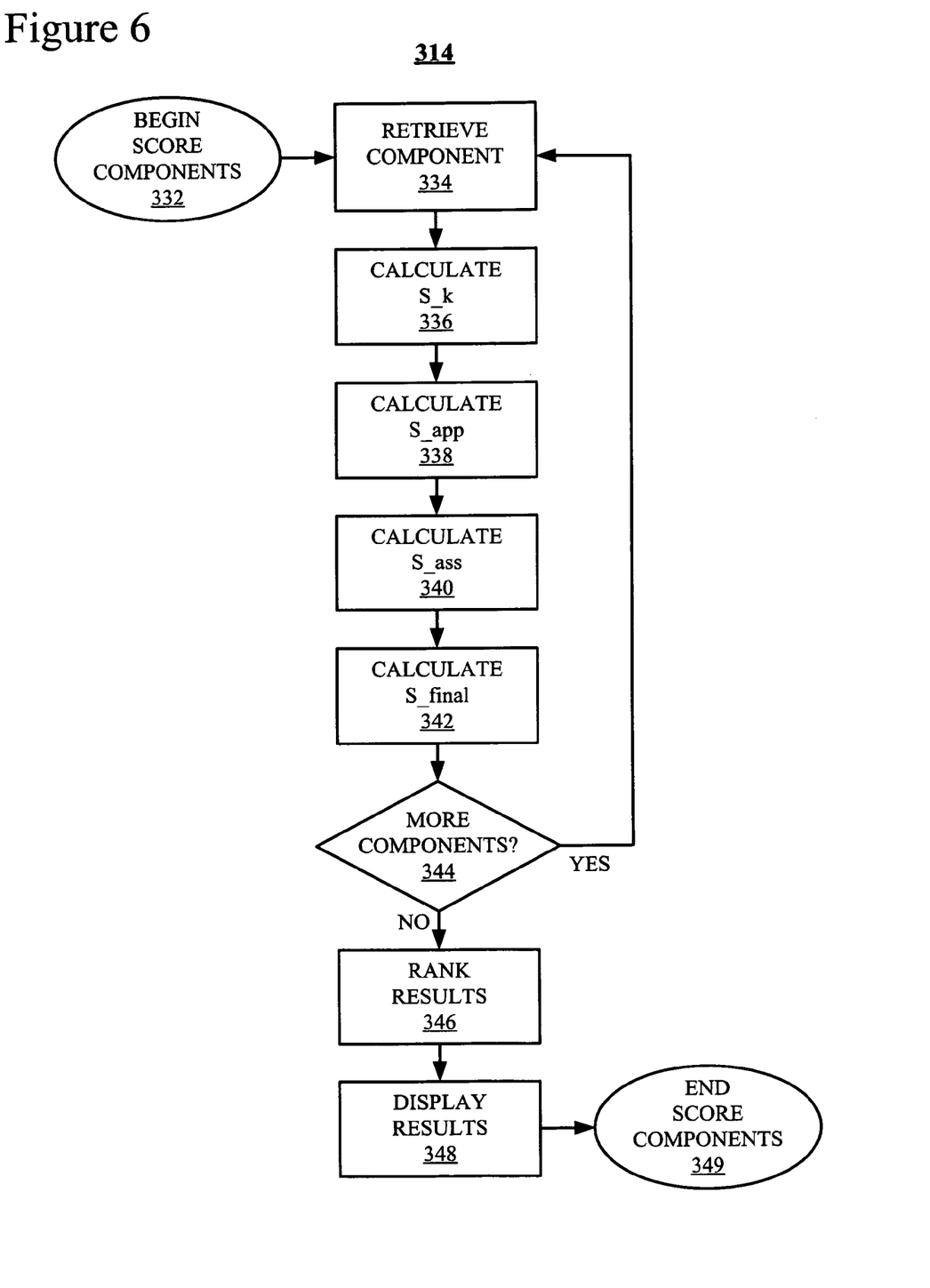
FIG. 6 is a flowchart that illustrates a Score Components aspect of the Select Components process of FIG. 5.

FIG. 6 is a flowchart that illustrates Score Components block 314 of Select Components process 300 of FIG. 5 in more detail. The processing associated with block 314 starts in a "Begin Score Components" block 332 and proceeds immediately to a "Retrieve Component" block 334. During block 334, process 300 scans a list (not shown) of components, stored in SCMMS data 120 (FIG. 1), that were selected during other blocks of Select Components process 300, such as module_1 112, module_2 114 and module_3 116, retrieves information concerning the first component, or target component, from the list and retrieves the MDDO memory object 200 corresponding to the particular component.

Process 300 then proceeds to a "Calculate Keyword Score (S_k)" block 336 during which process 300 calculates a keyword score based upon the degree of matching between keywords entered during Input Requirements block 304 (FIG. 5) and keywords associated with components and stored as meta descriptors in conjunction with SCMMS data 120. The process of calculating an S_k score for each component is explained in more detail below in conjunction with FIG. 8.

During a "Calculate Application Score (S_app)" block 338, process 300 compares the input requirements entered during Input Requirements block 304 with application dynamic attributes, which is stored as meta descriptors in conjunction with SCMMS data 120. An S_app score is calculated for each component remaining in the list of potential components. The process of calculating an S_app score for each component is explained in more detail below in conjunction with FIG. 9.

During a "Calculate Association Score (S_ass)" block 340, process 300 compares association attributes, stored as meta descriptors in conjunction with SCMMS data 120, with components that have previously been selected for inclusion in the desired application or business solution during process 300. An S_ass score is calculated for each component remaining in the list of potential components. The process of calculating an S_ass score for each component is explained in more detail below in conjunction with FIG. 10.

During a "Calculate S_final" block 342, the scores generated during blocks 336, 338 and 340 are employed to generate an S_final score for the target component from the list of potential components. One example of a formula for generating the S_final score is in the following form:

"$S\_final = A*S\_k + B*S\_app + C*S\_ass$, where A, B and C are constants for SCMMS 118 (FIG. 1) defined by a system administrator with knowledge of the context of the desired applications and/or business solutions. In other words, constants A, B and C are selected in order to maximize the results of SCMMS 118. Some exemplary general rules for the selection of constants A, B and C are as follows:

In a new system without a good knowledge base, e.g. components are not well-known applications, S_final relies more heavily on keyword matching, i.e. A>>B and C;

In a system that has been existence a relatively long time and has a well-established knowledge base, e.g. applications for components, scoring is based primarily on which components have been used previously and which requirements are common for the components, i.e. B>>A and C; and In a system in which there is a high correlation of selected components, i.e. same or similar set of components are frequently selected together, or in which compatibility is a concern constants A, B and C are defined so that C>>A and B.

During a "More Components?" block 344, process 300 determined whether or not there are any components in the list of components accessed during block 334 that need to be scored. If so, control returns to block 334 during which MDDO memory object 200 corresponding to the next component in the list is retrieved and processing continues as described above. If, during block 344, process 300 determines there are no more components to score, process 300 proceeds to a "Rank Results" block 346 during which all the scores of all the components retrieve during block 334 are ranked according to the corresponding S_final scores. During a "Display Results" block 348, process 300 displays the remaining components in the list of potential components, listed according to the corresponding S_final scores in the GUI on, in this example, monitor 104 (FIG. 1). Finally, the processing associated with Score Components block 314 of process 300 is complete in an "End Score Components" block 349.

Figure 7:
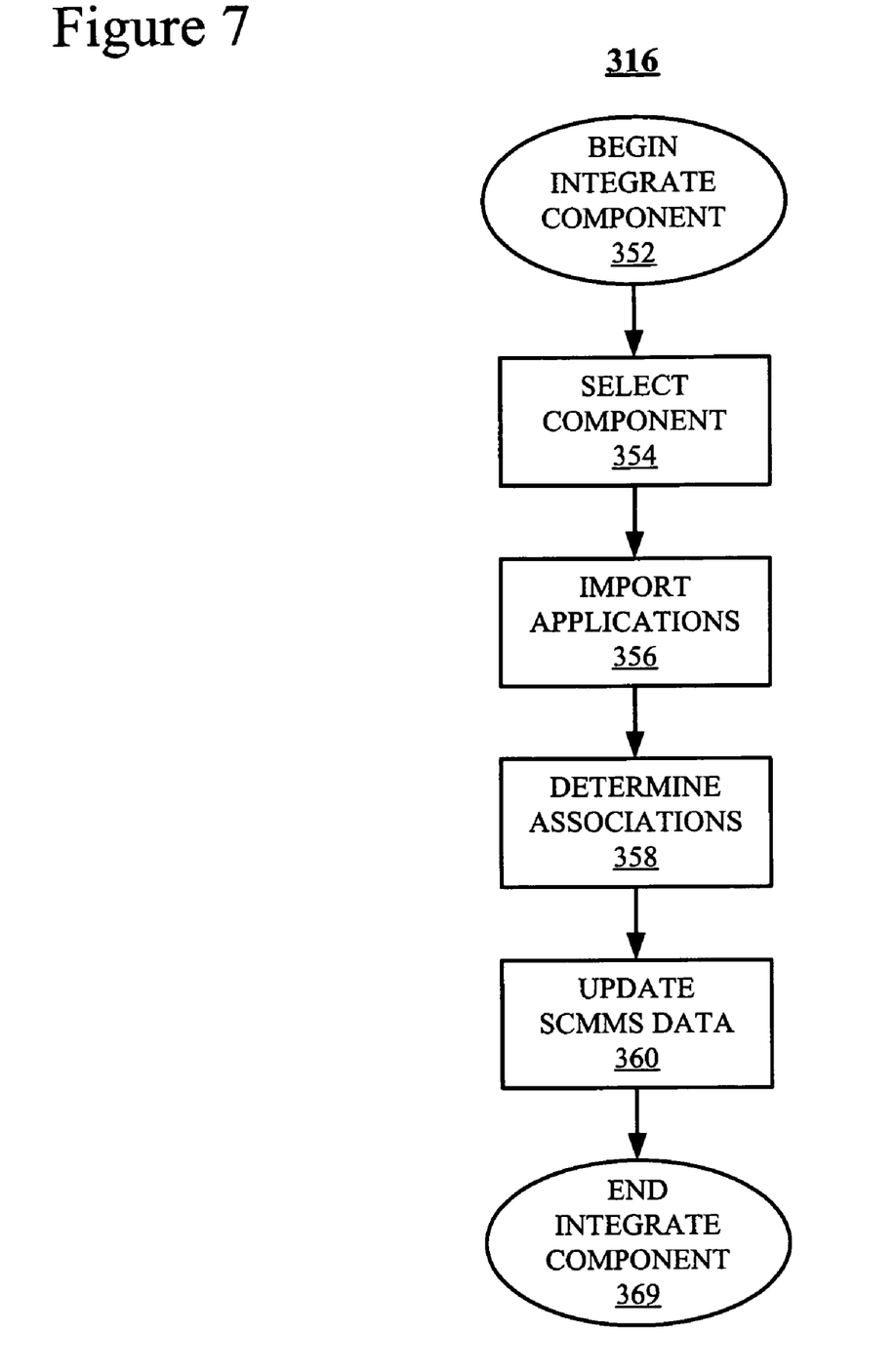
FIG. 7 is a flowchart that illustrates an Integrate Component aspect of the Select Components process of FIG. 5.

FIG. 7 is a flowchart that illustrates Integrate Component block 316 of Select Components process 300 of FIG. 5 in more detail. The processing associated with block 316 starts in a "Begin Integrate Component" block 352 and proceeds immediately to a "Select Component" block 354. During block 354, an operator browses the components in the ranked list generated and displayed on monitor 104 (FIG. 1) during Score Components block 314 (FIGS. 5 and 6) and related blocks 332, 334, 336, 338, 340, 342, 344 and 349 (FIG. 6). Further, the operator selects a component from the list for inclusion in the proposed application or business solution. Those with skill in the computing arts should appreciate the use and function of the GUI with respect to the browsing and selections of particular components.

During an "Import Applications" block 356, process 300 retrieves the component selected during block 354 for inclusion in the proposed application of business solution. It should be noted that a component can itself be an application. During a "Determine Associations" block 358 determines any new associations created as the result of the inclusion of the component selected during block 354 with any previously selected components.

During an "Update SCMMS Data" block 360, process 300 updates SCMMS data 120 (FIG. 1) with the new associations detected during block 358. In this manner, SCMMS 118 is able to make future iterations of process 300 more accurate and easier or, in other words, SCMMS 118 learns by storing association information for future reference. Finally, control proceeds to an "End Integrate Component" block 369 in which the processing associated with Integrate Component block 316 is complete.

Figure 8:
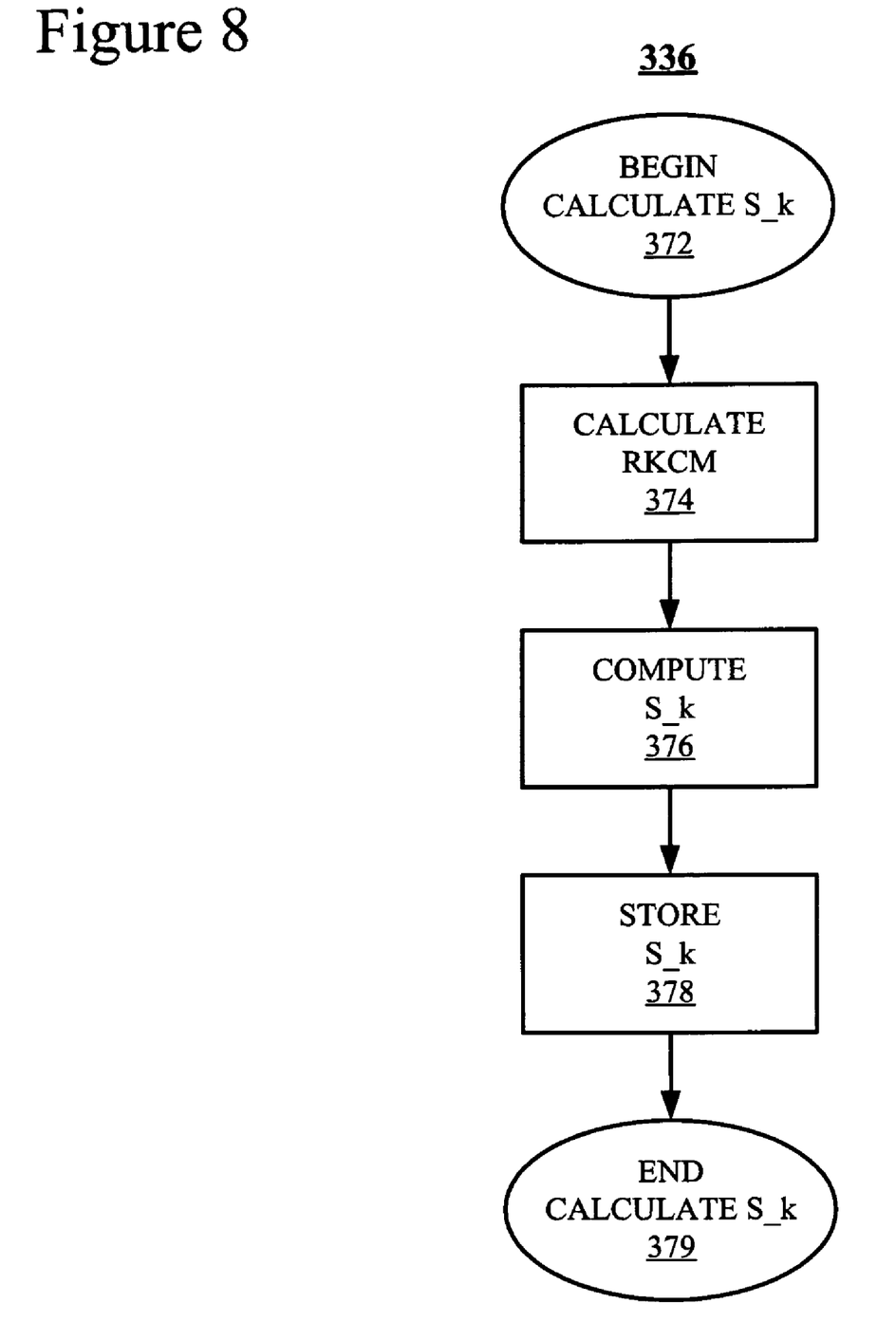
FIG. 8 is a flowchart that illustrates a Calculate Keyword Score (S_k) aspect of the Select Components process of FIG. 5.

FIG. 8 is a flowchart that illustrates in more detail Calculate S_k block 336 (FIG. 5), associated with Score Components block 314 of Select Components process 300 of FIG. 5. The processing associated with block 336 starts in a "Begin Calculate S_k" block 372 and proceeds immediately to a "Calculate Requirement Keyword Component Match (RKCM)" block 374. During block 374, process 300 determines a degree of correlation between keywords entered during Input Requirements block 304 (FIG. 4) and keywords stored in keywords attribute 228 of the MDDO memory object 200 retrieved during Retrieve Component block 334 (FIG. 6).

During a "Compute S_k" block 376, process 300 calculates a numerical score based upon the degree of matching between the keywords entered during Input Requirements block 304 (FIG. 5) and keywords stored in keywords attribute 228. This score is employed during Calculate S_final block 342 (FIG. 6) to determine a composite score, or S_final, used in Rank Results block 346 (FIG. 6) of process 300.

The score calculated during block 376 is stored in conjunction with a reference to the corresponding component during a "Store S_k" block 378. Finally, process 300 proceeds to an "End Calculate S_k" block 379 in which block 336 of process 300 is complete.

Figure 9:
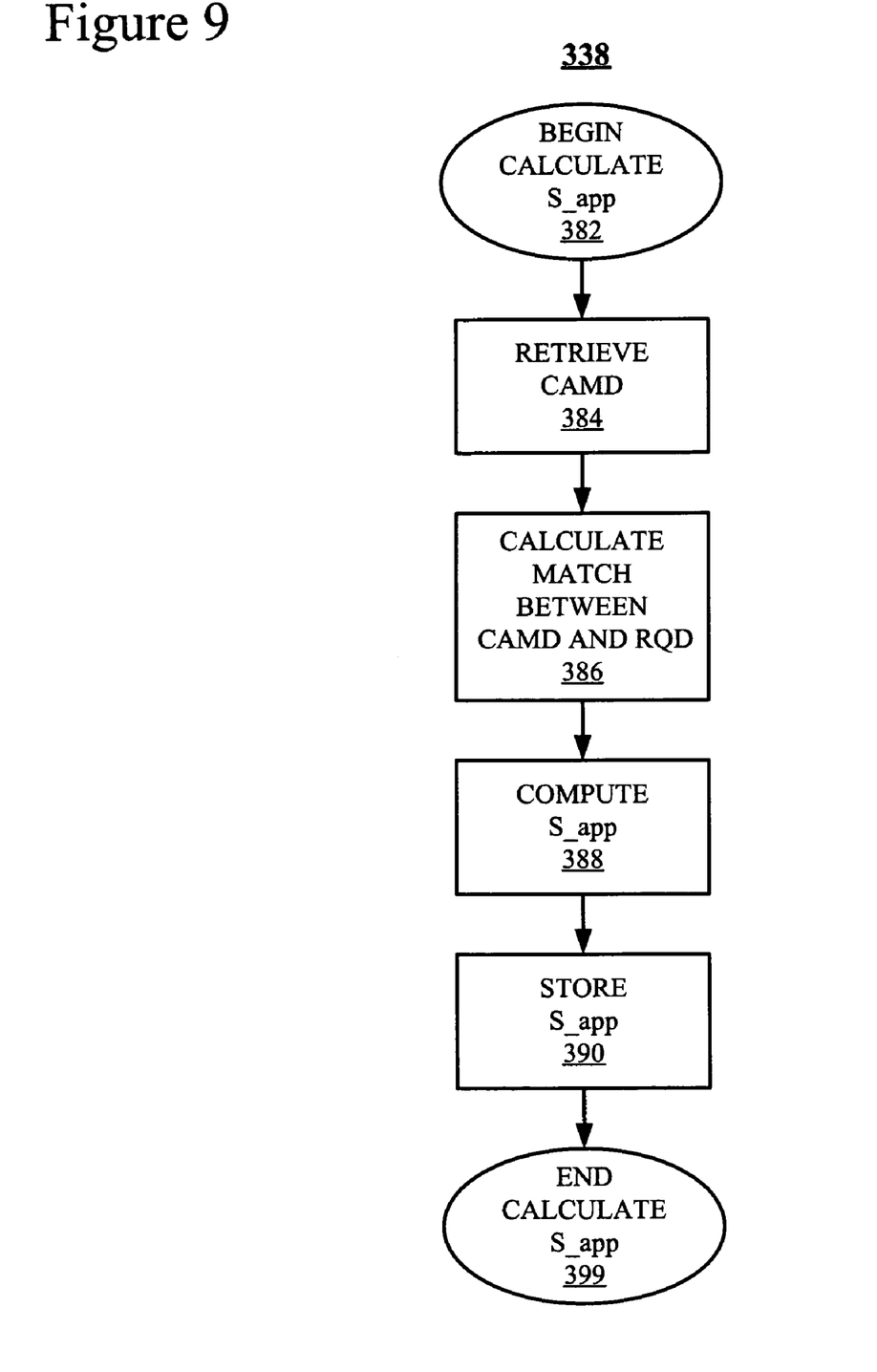
FIG. 9 is a flowchart that illustrates a Calculate Application Score (S_app) aspect of the Select Components process of FIG. 5.

FIG. 9 is a flowchart that illustrates in more detail Calculate S_app block 338 (FIG. 6), associated with Score Components block 314 of Select Components process 300 of FIG. 5. The processing associated with block 336 starts in a "Begin Calculate S_app" block 382 and proceeds immediately to a "Retrieve Component Applications MetaDescriptor (CAMD)" block 384. During block 394, process 300 retrieves applications attribute 230 (FIG. 4) associated with the memory object (FIG. 4) retrieved during Retrieve Component block 334 (FIG. 6).

During a "Calculate Match Between CAMD and Descriptor Requirements (RQD)" block 386, process 300 determines a degree of correlation between keywords entered during Input Requirements block 304 (FIG. 5) and associations stored in associations attribute 230 of the MDDO memory object 200 retrieved during Retrieve Component block 334.

During a "Compute S_app" block 388, process 300 calculates a numerical score based upon the degree of matching between the keywords entered during Input Requirements block 304 (FIG. 5) and associations stored in associations attribute 230 of the MDDO memory object 200 retrieved during Retrieve Component block 334. This score is employed during Calculate S_final block 342 (FIG. 6) to determine a composite score, or S_final, used in Rank Results block 346 (FIG. 6) of process 300.

The score calculated during block 388 is stored in conjunction with a reference to the corresponding component during a "Store S_app" block 390. Finally, process 300 proceeds to an "End Calculate S_app" block 399 in which block 338 of process 300 is complete.

Figure 10:
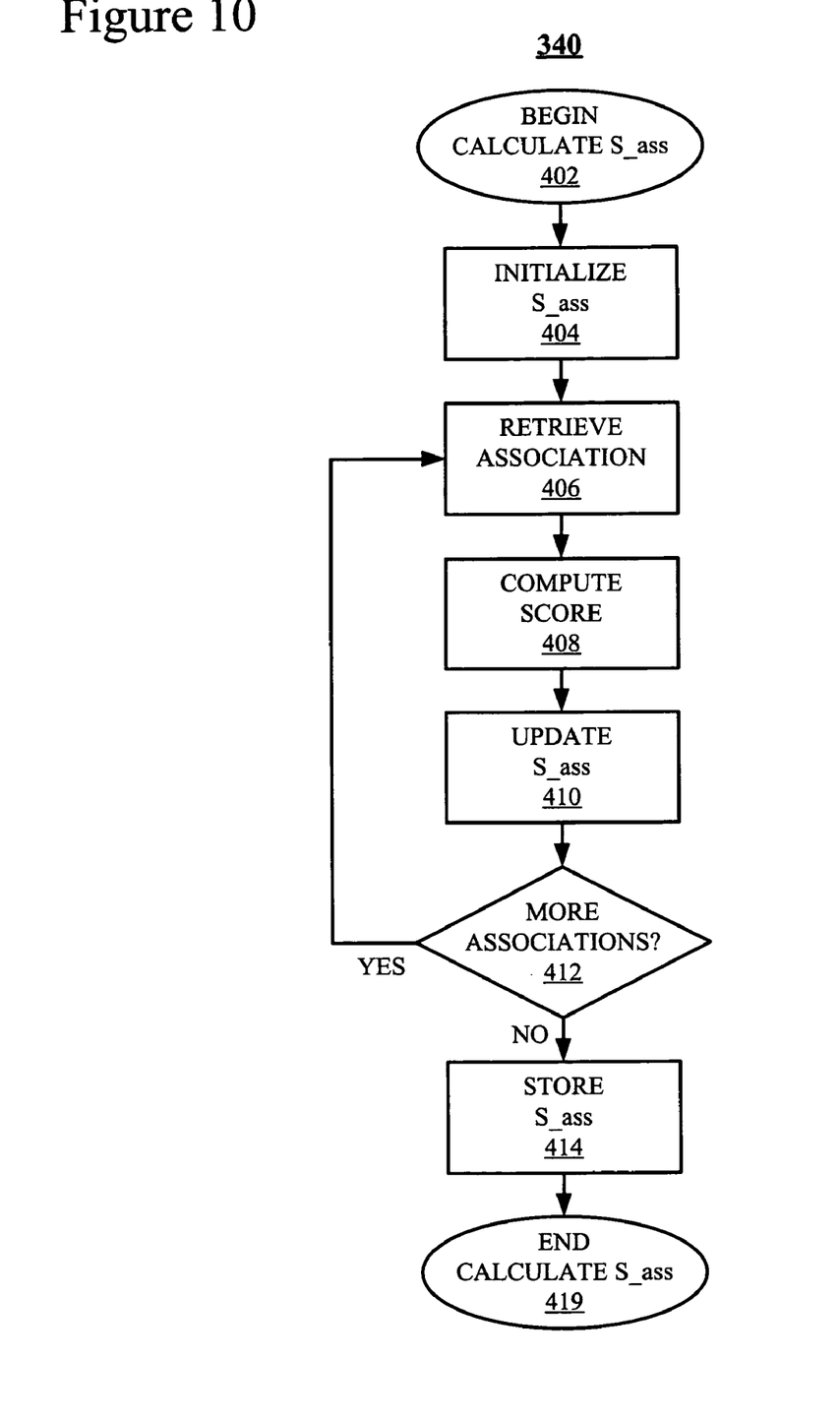
FIG. 10 is a flowchart that illustrates a Calculate Associations Score (S_ass) aspect of the Select Components process of FIG. 5.

FIG. 10 is a flowchart that illustrates in more detail Calculate S_ass block 340 (FIG. 6), associated with Score Components block 314 of Select Components process 300 of FIG. 5. The processing associated with block 340 starts in a "Begin Calculate S_ass" block 402 and proceeds immediately to an "Initialize S_ass" block 404. During block 404, process 300 initializes a value of S_ass that is employed during the remainder of block 340 to calculate an S_ass score for the particular component being scored. The particular component is from the list of components filtered during blocks 304, 306, 308, 310 and 312 of process 300, described above in conjunction with FIG. 5.

During a "Retrieve Association" block 406, process 300 retrieves the first association listed in associations attribute 232 (FIG. 4). During a "Compute Score" block 410, process 300 calculates a score based upon the number of similar associations that the association retrieved during block 406 has with components that have already been selected during Integrate Component block 316 (FIG. 4). In an "Update S_ass" block 410 process 300 updates the corresponding value of S_ass, which was first initialized during block 404, based upon the score calculated during block 408.

During a "More Associations?" block 412, process 300 determines whether or not there are more associations stored in attribute 232 that need to be calculated into the S_ass score. If so, process 300 returns to block 408 during which the next association in attribute 232 is selected and processing continues as described above. If during block 412 process 300 determines that all the associations stored in attribute 232 have been employed in the calculation of S_ass, process 300 continues to a "Store S_ass" block 414 during which process 300 stores the calculated S_ass score in conjunction with the targeted component. Finally, during an "End Calculate S_ass" block 419, block 340 of process 300 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for selecting software components from a hierarchical directory, comprising:

applying keyword matching rules to hierarchical component descriptors, each hierarchical component descriptor corresponding to a particular software component of a plurality of software components;

filtering the plurality of software components to produce a subset, wherein the filtering is based upon dependency and classification information stored in the hierarchical component descriptors;

scoring the subset of the plurality of software components to produce a ranking, the scoring based upon applying the keyword matching rules to the hierarchical component descriptors and association information and application information, both stored in the hierarchical component descriptors;

displaying a list of the subset of the plurality of software components along with the corresponding rankings;

selecting a particular software component displayed on the list;

calculating associations among the plurality of software components based upon the selection of the particular software component;

modifying the hierarchical component descriptors based upon the associations, the filtering and the selection of the particular software component from the list; and integrating the particular software component into a software application.

* * * * *